April 14, 1936.   V. A. ROHLIN ET AL   2,037,540
CONTROL VALVE
Filed Sept. 19, 1930   2 Sheets-Sheet 1

INVENTORS
VICTOR A. ROHLIN
and FRANKLIN M. PATTERSON
BY John E. Hubbell
ATTORNEY

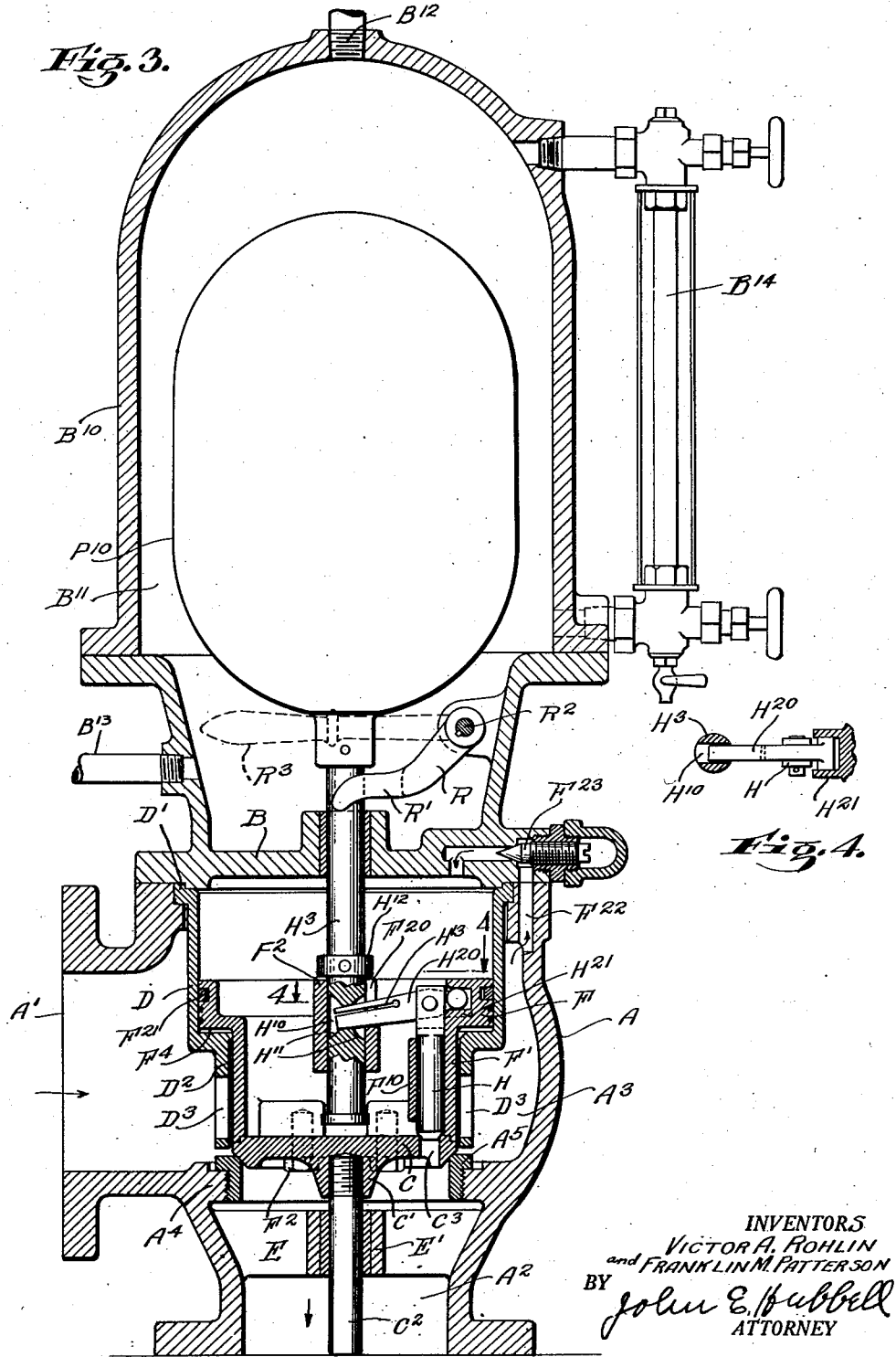

Patented Apr. 14, 1936

2,037,540

UNITED STATES PATENT OFFICE 2,037,540

CONTROL VALVE

Victor A. Rohlin, Philadelphia, Pa., and Franklin M. Patterson, Pitman, N. J., assignors to Cochrane Corporation, Philadelphia, Pa., a corporation of Pennsylvania Application September 19, 1930, Serial No. 482,928

23 Claims. (Cl. 137—103)

Our present invention relates in general to fluid control valves and more particularly, to fluid control valves of the pilot actuated type, generally operated through a float in response to changes in liquid level in a related apparatus. In the usual operation of control valves of this type, a small pilot valve is automatically actuated to vary the pressure on a piston connected to the main valve disc, which pressure is normally sufficient to hold the main valve disc seated when the pilot valve is closed. Such valves are preferably arranged for operating movements of the main valve in the same directions as the pilot valve, which arrangement advantageously avoids hunting or over-travel of the main valve.

The general object of our invention is the provision of an improved construction and mode of operation of a pilot actuated fluid control valve of the follow-up type particularly adapted for controlling the passage of a fluid in large quantities and/or under high pressures. A further and more particular object is the provision of a control valve of the above type with operating mechanism effecting a substantial increase in the pilot valve actuating force without changing the size or extent of movement of the control float. Another object is the provision of a control valve of this type with a substantial discharge port area and a travel of the main valve sufficient to render the entire port area effective. Another object is the provision of a control valve of this type with improved means for guiding the main valve during its movements and for insuring a uniform distribution of the discharging fluid about the main valve, and thereby avoiding the tendency of the valve to be displaced by the discharging fluid and to be caused to subsequently seat eccentrically. Our improved control valve is further characterized by its simplicity of construction and mode of operation, its positiveness of operation and durability under varying conditions, and its economy of maintenance.

The various features of novelty which characterize our invention are pointed out with particularity in the claims annexed to and forming a part of this specification. For a better understanding of the invention, however, and the advantages possessed by it reference should be had to the accompanying drawings and descriptive matter in which we have illustrated and described preferred embodiments of our invention.

Of the drawings:

Fig. 3 is a view similar to Fig. 1, illustrating a modified construction; and

Fig. 4 is a plan view of the pilot valve operating connections shown in Fig. 3.

Figure 1:
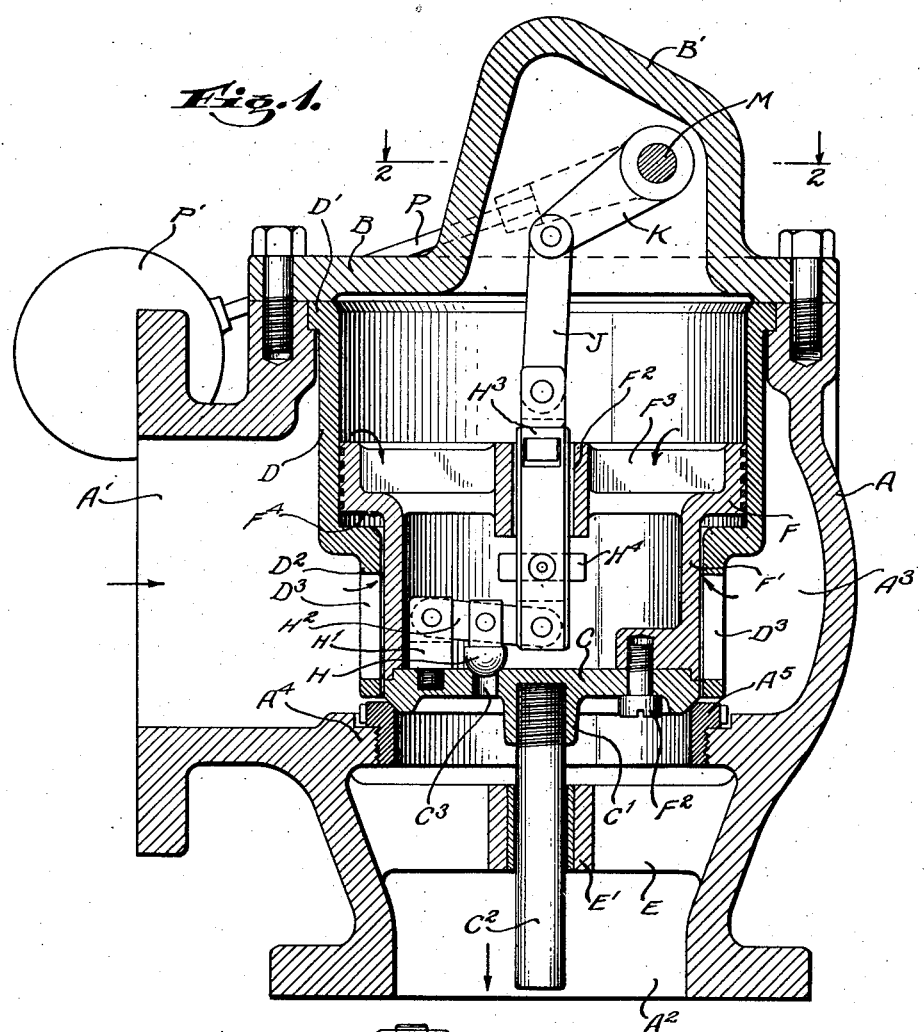
Fig. 1 is a sectional elevation of one embodiment of the invention with the main and pilot valves closed.

In the drawings, we have illustrated control valves adapted to control the flow of liquid to or from an open feed water heater, water softener, deaerator, or other apparatus handling liquids in large quantities and/or under high pressures, the valves being preferably actuated by a float responsive to changes in liquid level in the apparatus controlled or other related apparatus.

Figure 2:
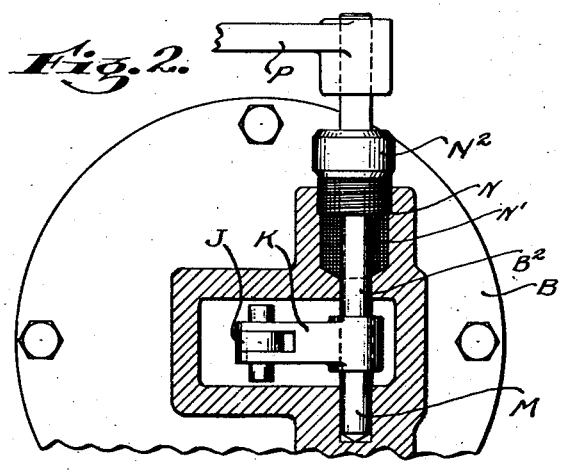
Fig. 2 is a horizontal section on the line 2—2 of Fig. 1.

In the control valve construction illustrated in Figs. 1 and 2, A designates the valve body, which is of general globular form and provided with a pair of angularly arranged flanged inlet and outlet ports or passages A' and A², respectively, opening to a central valve chamber A³. The upper end of the valve body is closed by a cover or bonnet B connected thereto and formed with a vertically projecting narrow housing B', for a purpose hereinafter described. At the junction of the valve chamber and outlet port, the valve body is formed with an annular internal flange A⁴ arranged to receive and removably support a seat member A⁵, as shown, for a main discharge valve disc C.

Occupying a substantial portion of the valve chamber is a tubular liner D having an externally flanged upper end D', closed by securing the flange between cooperating parts of the valve body and cover, and having a depending shroud D² of reduced internal diameter forming its lower portion. In the construction shown, the shroud D² is of slightly greater diameter than the valve disc C and is formed with a plurality of discharge ports D³, of substantial height and area, spaced about its circumference. The lower end of the shroud is shown as being slightly spaced vertically from the upper face of the valve seat A⁵.

The main and pilot valves and operating mechanism therefor are located within the liner D. The main valve comprises the disc C, which is formed with an internally threaded boss C' on its lower side and in which a depending guide stem C² is secured. This guide stem extends through the hub E' of a spider E, arranged across the outlet passage A². The valve disc C is held in fluid-tight engagement with the lower reduced portion F' of a piston F by cap screws F², as shown. The piston is tubular in form with its lower end closed by the disc C and its upper end opening to the upper portion of the liner. The upper portion of the piston is enlarged, as shown, and movable vertically in the piston chamber formed by the enlarged section of the liner, while the depending piston section moves simultaneously within the shroud $D^2$. The piston is preferably loosely mounted in the liner to permit liquid to pass through the shroud ports $D^3$, upwardly between the shroud and piston section F', and past the upper end of the piston into the space within the piston. The liquid thus seeping past the piston accumulates on the upper side of the valve disc C and holds it seated. There will be a continuous pressure on the lower face $F^4$ of the enlarged piston portion, tending to raise the valve disc from its seat. The valve disc will remain seated, however, as long as the fluid pressure on its upper side plus the weight of the valve parts is greater than the unseating force on the piston face $F^4$.

In order that the fluid pressure in the chamber above the valve disc C may be lowered to permit the main valve to be opened, the disc is formed with a passage $C^3$ therein, connecting the chamber with the outlet passage $A^2$. The passage $C^3$ is arranged at one side of the disc center, as shown, and is opened or closed by the movements of a pilot valve H relative thereto, which valve is arranged at the upper side of the disc. The disc passage should be of sufficient size to permit a rapid discharge of the accumulated liquid when the passage is open.

In control valves of this general type, the pilot valve has usually been heretofore operated by a control float through a leverage system including a vertically reciprocable valve stem mounted in the valve body and having the pilot valve formed on its lower end. We have found such arrangements unsatisfactory for high pressure use and also where large quantities of liquid were to be handled, as the pilot valve unseating force was frequently insufficient to overcome the pressures to which that valve was subjected. In such valves, the travel of the main valve was usually too limited for efficient operation. Increasing the size or travel of the float to increase the pilot valve actuating force is objectionable due to the substantial increase in cost of the float and/or the increased amount of space necessary. The travel of the main valve being dependent on the extent of movement of the reciprocal leverage element, any change in the ratio of the main float leverage to increase the pilot valve actuating force would decrease the movement of the valve stem and thereby the main valve travel for a given float travel.

In our improved valve construction, a substantial increase in pilot valve actuating force is obtained as well as a proper main valve travel for the port diameter present, without materially varying either the float size or float travel. The provisions securing these advantageous results include the particular location of the disc valve passage $C^3$ and the mounting of, and mechanism for operating, the pilot valve controlling that passage. The pilot valve is pivotally connected to an auxiliary lever $H^2$ fulcrumed on the main valve and preferably on a forked post H' on and near the periphery of the disc. The opposite end of the lever is connected to the lower end of a pilot valve stem $H^3$ reciprocably mounted in the hub $F^2$ of a spider $F^3$, which is formed within the upper end of the piston F. The lever $H^2$ extends over the disc passage $C^3$ with the valve H connected thereto immediately above the passage. By the foregoing arrangement a lever of the second class is provided. A collar $H^4$ is mounted on the valve stem at a point a short distance below the hub $F^2$ when the valves are in their closed position.

A connecting rod J extends between the upper end of the stem $H^3$ and an arm K of a bell crank lever mounted in the housing B' with one end projecting through a housing passage $B^2$. A stuffing box N consisting of packing N' and a gland nut $N^2$ renders the spindle passage $B^2$ fluid-tight. A float lever P is connected to the outer end of the spindle for transforming the rising and falling movements of a float P' into rotation of the spindle and vertical movements of the valve stem $H^3$. The foregoing arrangement of the connections avoids the excessive friction present in constructions where the spindle slides through the stuffing box.

With the control valve parts constructed and arranged as described, the valve will operate in the following manner when used, for example, for controlling the discharge from a liquid containing apparatus in response to the liquid level therein. In such an arrangement the valve inlet passage A' would be connected to the apparatus at a point below the normal liquid level therein and the float P' arranged therein at a level corresponding to the liquid level in the apparatus at which the pilot valve opening operation should begin. Assuming that the apparatus liquid level is below the float P' and the pilot and main valves are closed, liquid will continually seep in around the piston F and pass into the space within that part. The pressure of the accumulating liquid on the upper face of the valve C will hold the latter seated as long as the valves remain closed. Assuming that the liquid level in the controlled apparatus rises sufficiently to raise the float P', the spindle M will then be partly rotated to raise the valve stem $H^3$ and unseat the pilot valve. The described arrangement of the pilot valve operating connections insures a lifting force under all conditions sufficient to unseat the pilot valve.

The upward movement of the pilot-valve by the float permits the liquid above the main valve disc to exhaust through the disc passage $C^3$ at a rate dependent on the size of the passage and the position of the pilot valve relative thereto. When the float movement is sufficient to move the pilot valve to its wide open position, as defined by the collar $H^4$ abutting the hub $F^2$, the flow through the passage $C^3$ will be relatively rapid. During this time the inlet pressure is continuously acting on the annular face $F^4$ of the piston tending to raise the main valve disc C from its seat. When the fluid pressure on the upper face of the disc is reduced sufficiently, such as to a value 40% of the pressure differential between the inlet and outlet passage pressures, the upward pressure on the piston will cause the main valve to be raised and open the outlet passage $A^2$ to the liquid in the inlet passage. The spaced shroud ports $D^3$ provide a uniform distribution of the outflowing liquid to the outlet passage.

The pressure on the piston F will cause the valve disc C to move upwardly until it contacts with the pilot valve and the passage $C^3$ is again closed. The point at which this occurs depends upon the liquid level in the apparatus. If the liquid level rises while the valve disc is being raised, the closing contact will not occur until some time later than if the level should remain substantially the same or fall. If the level rises at a rate greater than the rate of movement of the disc, the collar $H^4$ engaging the piston spider will exert a force on the piston tending to increase the rate of upward movement of the disc C, and thus providing a more rapid opening of the discharge ports $D^3$ when the quantity of liquid to be discharged is high.

In normal operation, the rise in liquid level in the apparatus controlled will usually continue during the initial part of the discharge valve opening, causing the pilot valve to maintain its spaced relation relative to the disc C while this condition continues. When the liquid discharge is at a rate sufficient to prevent further rise in liquid level, the continued movement of the disc will cause the disc passage to be closed by the then stationary or downwardly moving pilot valve. When that occurs the liquid seeping past the piston may again accumulate on the disc and the increasing pressure effected thereby causes the disc to return to its seat. The disc will remain seated until the liquid level of the apparatus again rises sufficiently to cause the pilot valve to be opened.

During the foregoing movements, the disc C will be guided by the guide stem $C^2$ and the liner D. Even with a large quantity of liquid discharging at high pressures, the present shroud construction and guide means will substantially lessen any tendency for the disc to be displaced by the liquid during the disc seating movement. The described formation of the liner and piston eliminates any tendency for sudden movements of the main valve either away from or towards its seat, as the liquid can only enter the space below the piston at a relatively low rate during the raising movement of the disc and the restricted discharge of liquid therefrom during the return movement of the disc provides a dash pot action.

While our improved valve has been described in use as a discharge control valve operated in response to liquid level values in an apparatus containing the liquid being discharged, it is not restricted to such use and can be used with other types of apparatus and for other purposes. In Figs. 3 and 4, for example, a modified form of control valve constructed in accordance with our invention is illustrated for controlling the overflow from a liquid trap of a boiler feed water heater.

In this construction, most of the valve parts are arranged as heretofore described while others incorporate further and advantageous features. The pilot valve H is advantageously elongated as shown and arranged for vertical movements in a sleeve $F^{10}$ integrally formed on or attached to the inner side of the reduced section $F'$ of the piston. The upper end of the pilot valve is forked as shown and pivotally connected to an auxiliary operating lever $H^{20}$. A lever of the second class is formed by fulcruming one end of the lever $H^{20}$ in a bearing $H^{21}$ arranged on the upper enlarged end of the piston F adjacent the pilot valve pivot. The opposite end of the lever extends through a vertical slot $F^{20}$ in the piston hub $F^2$ and is inserted in a slot $H^{10}$ formed in the valve stem $H^3$. The outer ends of the slot $H^{10}$ are cut away at points $H^{11}$ as shown to permit an oscillating movement of the lever end therein. This connection permits a relative sliding movement between the lever and valve stem during any vertical movements of the latter and insures a straight line movement of the pilot valve H.

The end portion of the lever connected to the valve stem has a horizontal split $H^{13}$ therein and which portion, when compressed within the slot $H^{10}$, forms an elastic connection between the parts. This split construction permits the use of a collar $H^{12}$ on the valve stem immediately above the piston hub $F^2$ and arranged to press against the upper end thereof to hold the valve disc hard against its seat without exerting any injurious action on the pilot valve, due to the elasticity of its connection with the valve stem.

In this modification, the cover B carries a bell casing $B^{10}$ which forms a separate fluid-tight chamber $B^{11}$ for a control float $P^{10}$. The liquid level in the float chamber is maintained the same as the liquid level in the heater by means of upper and lower fluid connections $B^{12}$ and $B^{13}$. The control float $P^{10}$ is mounted directly on the upper end of the valve stem $H^3$, which projects through the cover B into the float chamber. The valve stem is thus moved in accordance with changes in liquid level in the chamber $B^{11}$. Any liquid leaking into the piston chamber from the float chamber does not disadvantageously affect the operation of the valve. A gauge glass $B^{14}$ of a well known form is used to indicate the liquid level in the float chamber.

In lieu of the loose piston arrangement permitting the seeping of liquid past the upper end of the piston into the piston chamber, the present piston F is provided with sealing rings $F^{21}$, which substantially eliminate any seeping, and a special leakage passage $F^{22}$ is provided to connect the inlet port $A'$ with the piston chamber. This passage is formed in the upper end of the valve body and in the cover B and is controlled by a needle valve $F^{23}$ externally adjustable to vary the liquid flow therethrough and thereby the rapidity of action of the main valve. This arrangement also avoids any need for highly accurate machining of the piston.

Mechanism is provided for manually operating the valve for test or other purposes and comprises a crank arm R having a forked end $R'$ arranged to engage the valve stem portion in the float chamber. The arm R is mounted on a spindle $R^2$, which extends through a suitable stuffing box in the casing $B^{10}$ and carries an operating lever $R^3$ on its external end.

The modified valve construction follows the same mode of operation as the valve shown in Figs. 1 and 2 except for the changes noted above which render the modified construction more effective. When the liquid level in the float chamber reaches a predetermined value, the float will rise, moving the valve stem vertically and gradually opening the pilot valve. In due course, the pressure on the under side of the piston effects an opening of the main valve and the consequent discharge of liquid through the outlet $A^2$. The pilot and main valves again engage on the subsequent drop in liquid level in the float chamber and are returned to their normal closed position and held therein by the pressure of the liquid entering the piston chamber through the leakage passage.

In each of the above constructions, the ratio of the control float movement to the pilot valve movement is quite large during the pilot valve opening movement. This ratio advantageously becomes considerably smaller during the combined raising movement of the main and pilot valves. A large valve lifting force is thus provided when most needed and with no increase in the float size or travel. A main valve travel exceeding one quarter of the port diameter, which is approximately the travel required to render the discharge passage fully effective, is practically certain under the contemplated operating conditions.

While in accordance with the provisions of the statutes, we have illustrated and described the best forms of embodiment of our invention now known to us, it will be apparent to those skilled in the art that changes may be made in the forms and arrangements of the parts of the control valve disclosed without departing from the spirit of our invention as set forth in the appended claims and that in some cases certain features of our invention may be used to advantage without a corresponding use of other features.

Having now described our invention what we claim as new and desire to secure by Letters Patent, is:

1. A control valve comprising a valve body having inlet and outlet ports, a main valve controlling said outlet port and fluid pressure operating means for said valve comprising a passage for the flow of fluid to said outlet port from said inlet port, and a pilot valve controlling said passage, said means subjecting said valve to an unbalanced valve closing force when said pilot valve is in its closed position, and to an unbalanced opening force when said pilot valve is in its wide open position, a control float arranged to exert a valve opening force on said pilot valve on a predetermined float travel, and valve operating connections between said control float and pilot valve at the pressure side of said main valve and arranged to provide a high ratio of float travel to pilot valve travel during the pilot valve opening movement and a lower ratio during subsequent movements of the pilot valve in the opening direction, the opening movements of the main and pilot valves and the movement of the float producing said opening movements being all in the same direction.

2. A control valve comprising a valve body having inlet and outlet ports, a main valve controlling said outlet port and fluid pressure operating means for said valve comprising a passage for the flow of fluid to said outlet port from said inlet port, and a pilot valve controlling said passage, said means subjecting said valve to an unbalanced valve closing force when said pilot valve is in its closed position, and to an unbalanced opening force when said pilot valve is in its wide open position, a control float arranged to exert a valve opening force on said pilot valve on a predetermined float travel, a reciprocable valve stem connected to said control float, and valve operating connections between said valve stem and pilot valve arranged to provide a high ratio of float travel to pilot valve travel during the pilot valve opening movement and a lower ratio during subsequent bodily movements of the pilot valve in the opening direction.

3. A control valve comprising a valve body having inlet and outlet ports, a main valve controlling said outlet port and fluid pressure operating means for said valve comprising a passage for the flow of fluid to said outlet port from said inlet port, and a pilot valve controlling said passage, said means subjecting said valve to an unbalanced valve closing force when said pilot valve is in its closed position, and to an unbalanced opening force when said pilot valve is in its wide open position, a reciprocable valve stem operatively connected to said pilot valve and arranged to exert a valve opening force thereon under predetermined conditions, a float mounted directly on said valve stem, and means for increasing said valve opening force.

4. A control valve comprising a valve body having inlet and outlet ports, a main valve controlling said outlet port and fluid pressure operating means for said valve comprising a passage for the flow of fluid to said outlet port from said inlet port, and a pilot valve controlling said passage, said means subjecting said valve to an unbalanced valve closing force when said pilot valve is in its closed position, and to an unbalanced opening force when said pilot valve is in its wide open position, a valve stem operatively connected to said pilot valve and arranged to exert a valve opening force thereon under predetermined conditions, and means incorporated in the operating connections between said valve stem and pilot valve for increasing said valve opening force.

5. A control valve comprising a valve body having inlet and outlet ports, a main valve controlling said outlet port and fluid pressure operating means for said valve comprising a passage for the flow of fluid to said outlet port from said inlet port, and a pilot valve controlling said passage, said means subjecting said valve to an unbalanced valve closing force when said pilot valve is in its closed position, and to an unbalanced opening force when said pilot valve is in its wide open position, an operating member arranged to exert a valve opening force on said pilot valve under predetermined conditions, and a second class lever fulcrumed on said main valve and connecting said member to said pilot valve for increasing said valve opening force.

6. A control valve comprising a valve body having inlet and outlet ports, a main valve having a disc controlling said outlet port and subjected to an unbalanced port closing force by the pressure on one side thereof of the fluid entering said valve body through said inlet port and a piston operatively connected to said disc and operable to move said disc to a port opening position when said fluid pressure is reduced a predetermined amount, a discharge passage in said disc connecting the pressure side of said disc to said outlet port, a pilot valve mounted on said main valve and controlling said passage and operable to vary the pressure on said disc, a reciprocable valve stem operatively connected to said pilot valve, a control float connected to said valve stem for exerting a pilot valve opening force thereon under predetermined conditions, and means for multiplying the valve opening force exerted on said valve stem.

7. A control valve adapted for use with liquids under high pressures and comprising a valve body having inlet and outlet ports, a tubular liner member in said body and in fluid-tight engagement therewith at one end to form a piston chamber, a main valve having a disc controlling said outlet port and a piston connected to said disc and arranged within said liner, means forming a restricted liquid passage between said inlet port and piston chamber, a discharge passage in said disc opening to said piston chamber, a pilot valve controlling said passage, and means for exerting a substantial force on said pilot valve to open said passage comprising a float responsive to changes in liquid level in a related apparatus, a reciprocable valve stem connected to said float, and a pilot valve operating lever connected to said stem and fulcrumed on said main valve at the side of said pilot valve opposite said valve stem.

8. A control valve adapted for use with liquids under high pressures and comprising a valve body having inlet and outlet ports, a tubular liner member in said body and in fluid-tight engagement therewith at its upper end, a main valve disc controlling said outlet port, a piston connected to said disc and loosely arranged within said liner, a discharge passage in said disc opening to the interior of said liner, a pilot valve controlling said passage, means for operating said pilot valve to open or close said passage, a shroud of reduced cross-section formed on the lower end of said liner, and a plurality of circumferentially spaced discharge ports formed in said shroud at the inlet side of said outlet port.

9. A control valve comprising a valve body having inlet and outlet ports, a main valve having a disc controlling said outlet port and subjected to an unbalanced port closing force by the pressure on one side thereof of the fluid entering said valve body through said inlet port and a piston operatively connected to said disc and operable to move said disc to a port opening position, a discharge passage in said disc connecting the pressure side of said disc to said outlet port, a pilot valve mounted on said main valve and controlling said passage and operable to vary the pressure on said disc, a reciprocable member operatively connected to said pilot valve, a control float connected to said member for exerting a pilot valve opening force thereon under predetermined conditions, and a second class lever fulcrumed on said disc and connecting said member to said pilot valve for multiplying said valve opening force.

10. A control valve adapted for use with liquids under high pressures and comprising a valve body having inlet and outlet ports, a main valve having a disc normally closing said outlet port and a piston connected to said disc and arranged in a piston chamber adjacent to said disc, said piston being loosely arranged to permit liquid from said inlet port to seep into said piston chamber, a discharge passage in said disc opening to said chamber, a pilot valve mounted on said main valve and controlling said passage to vary the liquid pressure in said chamber, and means for exerting a substantial valve opening force on said pilot valve comprising a float controlled bell crank lever, a reciprocable valve stem connected to said lever, and a pilot valve carrying lever fulcrumed on said main valve and connected to said valve stem.

11. A control valve adapted for use with liquids under high pressure and comprising a valve body having inlet and outlet ports, a tubular liner member in said body and forming a piston chamber, a main valve having a disc controlling said outlet port and a hollow piston connected thereto and having an enlarged upper end arranged within said liner chamber, means forming a restricted passage for liquid between said inlet port and piston chamber, a discharge passage in said disc opening to said piston chamber, a pilot valve controlling said passage, and means for moving said pilot valve to open said passage comprising a float responsive to changes in liquid level in a related apparatus, a rotatable spindle connected to said float, a reciprocable valve stem connected to said spindle, a post mounted on said disc, and a pilot valve operating lever connected to said stem and fulcrumed on said post.

12. A control valve adapted for use with liquids under high pressures and comprising a valve body having inlet and outlet ports and open at its upper end, a cover closing said open body end, a tubular liner member in said body and in fluid-tight engagement therewith at its upper end and forming a piston chamber, a main valve controlling said outlet port and formed by a valve disc and a hollow piston connected thereto, said piston having an enlarged upper end loosely arranged within said liner chamber to form a seeping connection between said inlet port and piston chamber, a discharge passage in said disc opening to said piston chamber, a pilot valve controlling said passage, and means for operating said pilot valve to open said passage comprising a float responsive to changes in liquid level in a related apparatus, a spindle rotatably mounted in said cover and connected to said float, a reciprocable valve stem connected to said spindle, a post mounted on said disc, and a pilot valve carrying lever connected to said stem and fulcrumed on said post.

13. A control valve adapted for use with liquids under high pressures and comprising a valve body having inlet and outlet ports, a tubular liner member in said body and forming a piston chamber, a main valve having a disc controlling said outlet port and a hollow piston connected thereto and having an enlarged end loosely arranged within said liner chamber to form a seeping connection between said inlet port and piston chamber, a discharge passage in said disc opening to said piston chamber, a pilot valve controlling said passage, a spider extending across the upper end of said piston, and means for operating said pilot valve to open said passage comprising a float responsive to changes in liquid level in a related apparatus, a reciprocable valve stem extending through said spider and connected to said float, a collar mounted on said stem and arranged to engage said piston spider after a predetermined movement, and a pilot valve operating lever connected to said stem and fulcrumed on said main valve.

14. A control valve comprising a valve body having inlet and outlet ports, a main valve having a disc controlling said outlet port and subjected to an unbalanced port closing force by the pressure on one side thereof of the fluid entering said valve body through said inlet port and a piston operatively connected to said disc and operable to move said disc to a port opening position, a discharge passage in said disc connecting the pressure side of said disc to said outlet port, a pilot valve mounted on said main valve and controlling said passage and operable to vary the pressure on said disc, a reciprocable member operatively connected to said pilot valve, a control float connected to said valve stem for exerting a pilot valve opening force thereon under predetermined conditions, and a second class lever fulcrumed on said piston and connecting said pilot valve and member for multiplying said pilot valve opening force.

15. A control valve comprising a valve body having inlet and outlet ports, a main valve controlling said outlet port and normally held in a port closing position by fluid pressure on one side thereof, a discharge passage connecting the pressure side of said main valve with said outlet port, a pilot valve controlling said passage and operable to vary the pressure on said main valve, a valve stem arranged to exert a valve opening force on said pilot valve under predetermined conditions, a slot in said valve stem, means for increasing said valve opening force comprising a lever inserted in said valve stem slot and connecting said valve stem to said pilot valve, a collar carried on said valve stem for holding said main valve firmly seated under certain conditions, and a split in the valve stem end of said lever providing an elastic connection between said parts.

16. A control valve adapted for use with liquids under high pressures and comprising a valve body having inlet and outlet ports, a tubular liner member in said body and in fluid-tight engagement therewith at one end to form a piston chamber, a main valve having a disc controlling said outlet port and a piston connected to said disc and arranged within said liner, means providing a restricted liquid flow between said inlet port and piston chamber comprising a passage connecting said port and chamber and a needle valve controlling said passage, a discharge passage in said disc opening to said piston chamber, a pilot valve controlling said passage, and means for exerting a substantial force on said pilot valve to open said discharge passage comprising a float responsive to changes in liquid level in a related apparatus, a reciprocable valve stem connected to said float, and a pilot valve operating lever connected to said stem and fulcrumed on said main valve at the side of said pilot valve opposite said valve stem.

17. A control valve comprising a valve body having inlet and outlet ports, a main valve controlling said outlet port and fluid pressure operating means for said valve comprising a passage for the flow of fluid to said outlet port from said inlet port, and a pilot valve controlling said passage, said means subjecting said valve to an unbalanced valve closing force when said pilot valve is in its closed position, and to an unbalanced opening force when said pilot valve is in its wide open position, a valve stem operatively connected to said pilot valve and arranged to exert a valve opening force thereon under predetermined conditions, means for increasing said valve opening force, and means on the pressure side of said main valve for guiding said pilot valve during its movements.

18. A control valve comprising a valve body having inlet and outlet ports, a main valve having a disc controlling said outlet port and subjected to an unbalanced port closing force by the pressure on one side thereof of the fluid entering said valve body through said inlet port and a hollow piston operatively connected to said disc and operable to move said disc to a port opening position, a discharge passage in said disc connecting the pressure side of said disc to said outlet port, an elongated pilot valve mounted on said main valve and controlling said passage and operable to vary the pressure on said disc, a reciprocable valve stem operatively connected to said pilot valve, a control float connected to said valve stem for exerting a pilot valve opening force thereon under predetermined conditions, and a sleeve on the inner side of said piston for guiding said pilot valve during its movements.

19. A control valve comprising a valve body having inlet and outlet ports, a main valve controlling said outlet port and normally held in a port closing position by fluid pressure on one side thereof, a discharge passage connecting the pressure side of said main valve with said outlet port, a pilot valve controlling said passage and operable to vary the pressure on said main valve, a reciprocable valve stem arranged to exert a valve opening force on said pilot valve under predetermined conditions and means for connecting said valve stem to said pilot valve comprising a second class lever fulcrumed on said main valve and pivotally connected to said pilot valve, the opposite end of said lever being slidable in said valve stem.

20. A control valve comprising a valve body having inlet and outlet ports, a main valve controlling said outlet port and normally held in a port closing position by fluid pressure on one side thereof, a discharge passage in said main valve connecting the pressure side thereof to said outlet port, a pilot valve controlling said passage and operable to vary the pressure on said main valve, a reciprocable member operatively connected to said pilot valve, a control float connected to said member for exerting a pilot valve opening force thereon under predetermined conditions, an auxiliary manually operable means including an external operating part normally out of operative engagement with said member and offering no interference with the float actuated movements of the latter but operable through said part to engage said member and move the latter to actuate said pilot valve.

21. A pilot-controlled valve comprising a valve body providing a valve port intermediate normally high and low pressure channels, a main valve controlling said port and normally held in a port closing position by fluid pressure in a space at one side thereof and normally subjected to another fluid pressure action moving said valve to a port opening position when the first mentioned fluid pressure falls below a predetermined value, means providing a passage from the high pressure channel side of said port to said space at the side of said main valve, means providing a passage of greater effective cross-sectional area from said space to the low pressure channel side of said port, a pilot valve mounted on said main valve and controlling said last mentioned passage and operable to vary the pressure tending to hold said main valve in its closed position, said pilot valve being arranged to move in operation in the same direction as said main valve on a movement of the latter effected thereby, means for variably positioning said pilot valve, and a leverage mechanism connecting said last mentioned means to said pilot valve and arranged to provide a high ratio of travel of said last mentioned means to pilot valve travel during the pilot valve opening movement and a lower ratio during subsequent movements of said pilot valve in the same direction.

22. A pilot-controlled valve comprising a valve body providing a valve port intermediate normally high and low pressure channels, a main valve controlling said port and normally held in a port closing position by fluid pressure in a space at one side thereof and normally subjected to another fluid pressure action moving said valve to a port opening position when the first mentioned fluid pressure falls below a predetermined value, means providing a passage from the high pressure channel side of said port to said space at the side of said main valve, means providing a passage of greater effective cross-sectional area from said space to the low pressure channel side of said port, a pilot valve mounted on said main valve and controlling said last mentioned passage and operable to vary the pressure tending to hold said main valve in its closed position, said pilot valve being arranged to move in operation in the same direction as said main valve on a movement of the latter effected thereby, means for variably positioning said pilot valve, and parts connecting said last mentioned means to said pilot valve and arranged to provide a high ratio of travel of said last mentioned means to pilot valve travel during the pilot valve opening movement and a lower ratio during subsequent movements of said pilot valve in the same direction comprising a reciprocable member, a lever connected thereto, and means connecting said pilot valve to said lever at a point between the fulcrum of said lever and its point of connection to said reciprocable member.

23. A pilot-controlled valve comprising a valve body providing a valve port intermediate normally high and low pressure channels, a main valve controlling said port and normally held in a port closing position by fluid pressure in a space at one side thereof and normally subjected to another fluid pressure action moving said valve to a port opening position when the first mentioned fluid pressure falls below a predetermined value, means providing a passage from the high pressure channel side of said port to said space at the side of said main valve, means providing a passage of greater effective cross-sectional area from said space to the low pressure channel side of said port, a pilot valve controlling said last mentioned passage and operable to vary the pressure tending to hold said main valve in its closed position, said pilot valve mounted on said main valve and being arranged to move in operation in the same direction as said main valve on a movement of the latter effected thereby, a float for controlling said pilot valve, a leverage mechanism arranged in said space and connecting said float to said pilot valve and providing a high ratio of travel of said float to pilot valve travel during the pilot valve opening movement and a lower ratio during subsequent movements of said pilot valve in the same direction and including means for directly effecting a port opening movement of said main valve after a predetermined relative movement of said pilot and main valves.

VICTOR A. ROHLIN.
FRANKLIN M. PATTERSON.